United States Patent
Yamanaka et al.

(10) Patent No.: US 7,947,780 B2
(45) Date of Patent: May 24, 2011

(54) RESIN COMPACT, CASING AND PRODUCTION METHOD OF RESIN COMPACT

(75) Inventors: Makiko Yamanaka, Kanagawa (JP); Ryuichiro Maeyama, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 608 days.

(21) Appl. No.: 11/898,330

(22) Filed: Sep. 11, 2007

(65) Prior Publication Data

US 2008/0188620 A1     Aug. 7, 2008

(30) Foreign Application Priority Data

Feb. 2, 2007    (JP) ................................. 2007-024488

(51) Int. Cl.
*C08L 67/02* (2006.01)
(52) U.S. Cl. ........................................ 525/166; 525/177
(58) Field of Classification Search .................. 525/166, 525/177

See application file for complete search history.

(56) References Cited

U.S. PATENT DOCUMENTS

| | | | | |
|---|---|---|---|---|
| 5,045,596 A | * | 9/1991 | Laughner | ........................ 525/67 |
| 2005/0179153 A1 | | 8/2005 | Riise et al. | |
| 2009/0214861 A1 | | 8/2009 | Ogawa et al. | |

FOREIGN PATENT DOCUMENTS

| | | | |
|---|---|---|---|
| CN | 101316894 A | | 12/2008 |
| DE | 19959420 | * | 6/2001 |
| JP | A 2001-026719 | | 1/2001 |
| JP | A 2001-279114 | | 10/2001 |
| JP | A 2002-265798 | | 9/2002 |
| JP | A 2003-160724 | | 6/2003 |
| JP | 2005-162819 | | 6/2005 |

OTHER PUBLICATIONS

Jan. 6, 2011 Chinese Office Action issued in Chinese Patent Application No. 20071016253.6 (with translation).

* cited by examiner

*Primary Examiner* — Bernard Lipman
(74) *Attorney, Agent, or Firm* — Oliff & Berridge, PLC

(57) ABSTRACT

A resin compact includes two or more kinds of resins, wherein when a Charpy impact strength in a resin flow direction at shaping is $S_{MD}$ and a Charpy impact strength in a direction crossing the resin flow direction at shaping is $S_{TD}$, $S_{MD}/S_{TD}$ is from 3.5 to 5.0.

7 Claims, 1 Drawing Sheet

RESIN COMPACT, CASING AND PRODUCTION METHOD OF RESIN COMPACT

CROSS-REFERENCE TO RELATED APPLICATION

This application is based on and claims priority under 35 USC 119 from Japanese Patent Application No. 2007-024488 filed Feb. 2, 2007.

BACKGROUND

1. Technical Field

The present invention relates to a resin compact, a casing and a production method of a resin compact.

2. Related Art

In the fields such as office equipment field, electric/electronic device field and automobile field, a resin compact is being widely used. Above all, in recent years, a resin compact comprising a resin composition prepared by blending a styrene-based resin such as polystyrene-based resin (hereinafter sometimes referred to as a "PS-based resin") or acrylonitrile-butadiene-styrene-based resin (hereinafter sometimes referred to as an "ABS-based resin") with a polycarbonate-based resin (hereinafter sometimes referred to as a "PC-based resin") is increasingly used for a part such as casing of office equipment or electronic/electric devices. In particular, high mechanical property is required of the resin compact used for a casing or the like of office equipment.

On the other hand, in view of recycling of resources and environmental protection, particularly in the field of office equipment such as computer, printer and copying machine, the demand for recycling of reusing the product recovered from the market is more and more increasing.

In order to increase the content ratio of a material used on the market (hereinafter sometimes referred to as a "recycled material"), studies have been heretofore made on the technique of suppressing the reduction in the mechanical strength when a recycled material is used.

SUMMARY

According to an aspect of the invention, there is provided a resin compact, including: two or more kinds of resins, wherein when a Charpy impact strength in a resin flow direction at shaping is $S_{MD}$ and a Charpy impact strength in a direction crossing the resin flow direction at shaping is $S_{TD}$, $S_{MD}/S_{TD}$ is from 3.5 to 5.0.

BRIEF DESCRIPTION OF THE DRAWINGS

Exemplary embodiments of the present invention will be described in detail based on the following figures, wherein.

DETAILED DESCRIPTION

Figure 1:
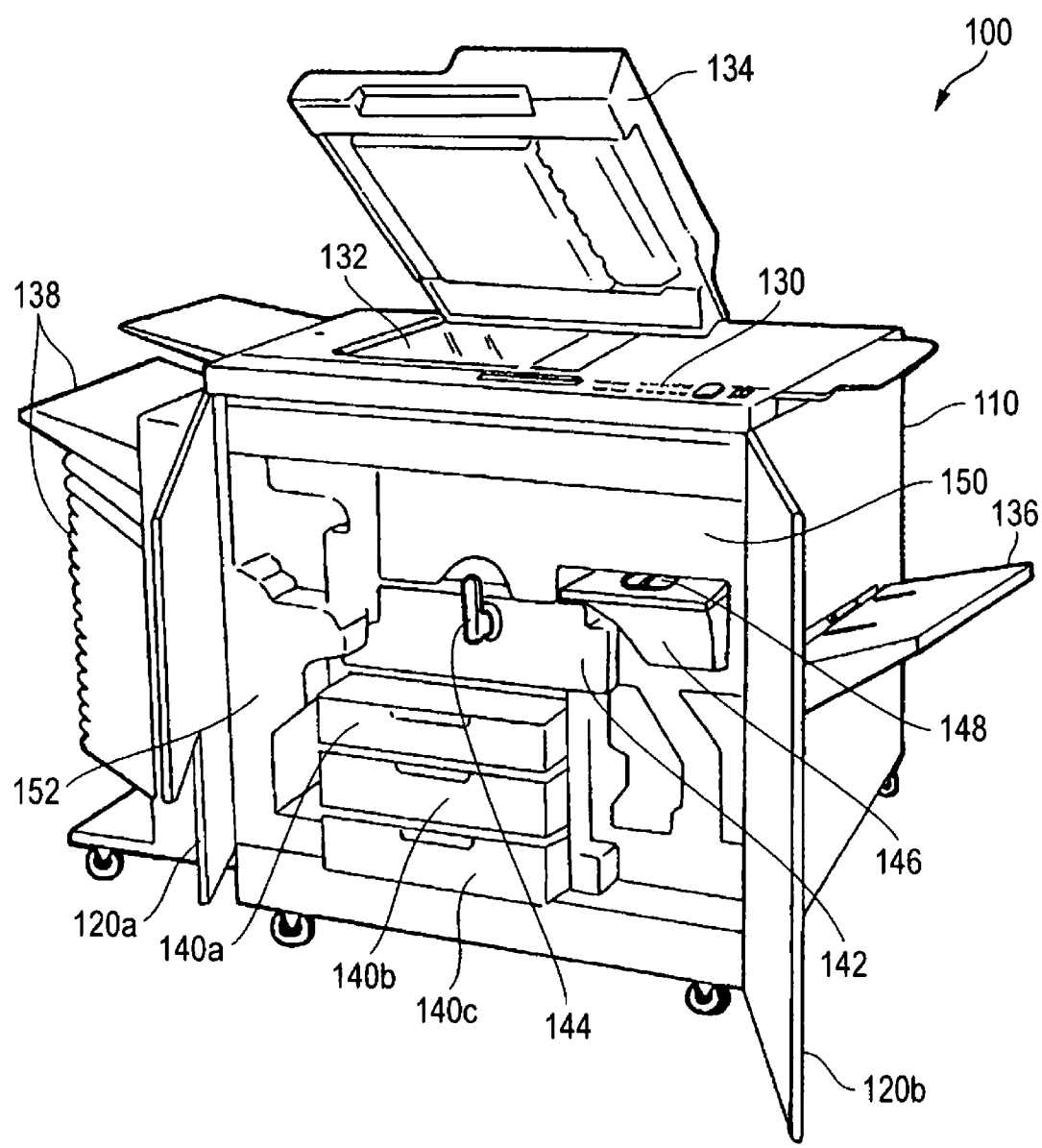
FIG. 1 illustrates an outer appearance perspective view of an image forming apparatus comprising a casing and office equipment parts according to one exemplary embodiment of the resin compact of the present invention.

Preferred exemplary embodiments of the resin compact, the production method of the resin compact, and the casing of the present invention are described below.

<Resin Compact>

The resin compact of this exemplary embodiment comprises two or more kinds of resins and assuming that the Charpy impact strength in the resin flow direction (hereinafter sometimes referred to as the "MD direction") at the shaping is $S_{MD}$ and the Charpy impact strength in the direction crossing the resin flow direction (hereinafter sometimes referred to as the "TD direction") at the shaping is $S_{TD}$, $S_{MD}/S_{TD}$ is from 3.5 to 5.0.

The "Charpy impact strength ($S_{MD}$) in the resin flow direction" as used herein means a Charpy impact strength obtained by measuring a specimen produced from a resin compact such that all tangential directions drawn with respect to the resin flow direction at the shaping make an angular difference of 45° or less from the longitudinal direction of an ISO multipurpose specimen. Also, the "Charpy impact strength ($S_{TD}$) in the direction crossing the resin flow direction at the shaping" means a Charpy impact strength obtained by measuring a specimen produced from a resin compact such that all tangential directions drawn with respect to the resin flow direction at the shaping make an angular difference of 45° or less from the crosswise direction of an ISO multipurpose specimen.

Also, in the present invention, the Charpy impact strength means a value measured using an impact tester according to JIS K7111 under the conditions such that the lifting angle is 150°, the hammer used is 2.0 J and the number of measurements is n=10.

If $S_{MD}/S_{TD}$ is less than 3.5, the anisotropy is small and the effect of maintaining or enhancing the mechanical strength of each resin contained cannot be satisfactorily obtained, whereas if $S_{MD}/S_{TD}$ exceeds 5.0, since the Charpy impact strength of even a resin compact having a high Charpy impact strength is approximately from 60 to 70 kJ/m² sufficiently high Charpy impact strength in the TD direction cannot be obtained and the resin compact comes to have poor mechanical strength. In the resin compact of this exemplary embodiment, the Charpy impact strength in the TD direction is preferably 7 kJ/m² or more, more preferably 10 kJ/m² or more.

In the resin compact of this exemplary embodiment, one or more kinds of resins selected from the following group (A) and one or more kinds of resins selected from the group (B) are preferably contained as the two or more kinds of resins.

Group (A):

A polycarbonate-based resin, an alloy resin of polycarbonate-based resin and acrylonitrile-butadiene-styrene-based resin (hereinafter simply referred to as a "PC/ABS alloy resin"), a polycarbonate-based resin having at least partially a siloxane bond, and an alloy resin thereof.

Group (B):

A PC/ABS alloy resin different from that in the group (A), an alloy resin of polycarbonate-based resin and styrene-based resin (hereinafter simply referred to as a "PC/PS alloy resin"), a recycled material of polycarbonate-based resin, a recycled material of PC/ABS alloy resin, a recycled material of PC/PS alloy resin, a recycled material of polycarbonate-based resin having at least partially a siloxane bond, and a recycled material of alloy resin of polycarbonate-based resin having at least partially a siloxane bond.

Examples of the polycarbonate-based resin include "Iupilon FPR3000" (trade name, produced by Mitsubishi Engineering-Plastics Corp.).

Examples of the PC/ABS alloy resin include "Multilon TN7300" (trade name, produced by Teijin Chemicals Ltd.).

Examples of the PC/PS alloy resin include "PC/PS Alloy Resin TARFLON NN2710AS" (trade name, produced by Idemitsu Kosan Co., Ltd.).

The resin (A) and the resin (B) contained in the resin compact of this exemplary embodiment are preferably incompatible. More specifically, a combination of a polycarbonate-based resin as the resin (A) and a styrene-based resin-containing alloy resin as the resin (B) is preferred. Incidentally, whether the resins contained in the resin compact are incompatible or not can be confirmed, for example, by observing the fracture cross-section.

The resin compact of this exemplary embodiment preferably contains a polycarbonate-based resin having a p-cumylphenoxy group represented by the following formula (1):

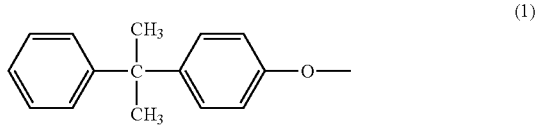

The p-cumylphenoxy group represented by formula (1) may be present at least at one terminal out of two terminals of the molecular chain of the polycarbonate-based resin or may be present in the side chain of the molecular chain.

Such a polycarbonate-based resin can be produced, for example, by melt-polycondensing an aromatic dihydroxy compound and a carbonic acid diester in the presence of a terminal blocking agent containing a compound capable of introducing a p-cumylphenoxy group. Examples of the compound capable of introducing a p-cumylphenoxy group include p-cumylphenol, p-cumylphenylphenyl carbonate and p-cumylphenyl carbonate.

The polycarbonate-based resin having a p-cumylphenoxy group represented by formula (1) is commercially available, for example, as "LEXAN 221R" (trade name, produced by Nippon GE Plastics Co.).

From the standpoint of ensuring the mechanical strength and effectively utilizing the recycled material, the content of this polycarbonate-based resin is preferably from 10 to 90 mass %, more preferably from 15 to 86 mass %, still more preferably from 20 to 80 mass %, based on the entire amount of the resin compact.

The polycarbonate-based resin having a p-cumylphenoxy group represented by formula (1) may be contained as an alloy resin alloyed with another resin. As for the another resin, an ABS-based resin is preferred in view of flowability and shaping processability.

The resin compact of this exemplary embodiment preferably contains a polycarbonate-based resin allowing the Charpy impact strength in the resin flow direction at the shaping to become from 0.9 to 3.4 times the Charpy impact strength in the direction crossing the resin flow direction at the shaping.

Such a polycarbonate-based resin can be produced, for example, by melt-polycondensing an aromatic dihydroxy compound and a carbonic acid diester in the presence of a terminal blocking agent containing a compound capable of introducing a p-cumylphenoxy group. Examples of the compound capable of introducing a p-cumylphenoxy group include p-cumylphenol, p-cumylphenylphenyl carbonate and p-cumylphenyl carbonate. Examples of the commercially available product include "LEXAN 221R" (trade name, produced by Nippon GE Plastics).

From the standpoint of ensuring the mechanical strength and effectively utilizing the recycled material, the content of this polycarbonate-based resin is preferably from 10 to 90 mass %, more preferably from 15 to 86 mass %, still more preferably from 20 to 80 mass %, based on the entire amount of the resin compact.

The resin compact of this exemplary embodiment preferably contains, as the one or more kinds of resins selected from the group (B), one or more kinds of resins selected from an alloy resin of polycarbonate-based resin and acrylonitrile-butadiene-styrene-based resin, and an alloy resin of polycarbonate-based resin and styrene-based resin.

In the resin compact of this exemplary embodiment, from the standpoint of ensuring the mechanical strength and effectively utilizing the recycled material, the recycled material is preferably contained in an amount of 5 to 20 mass %, more preferably from 10 to 15 mass %, based on the entire amount of the resin compact.

Preferred examples of the recycled material include a recycled material of the above-described polycarbonate-based resin, a recycled material of PC-ABS alloy resin, and a recycled material of PC/PS alloy resin.

In the resin compact of this exemplary embodiment, the compact surface preferably has a glossiness of 50 to 100 by taking into consideration the use for a product which is often publicly exposed in an office or the like, such as exterior cover of a copying machine. The glossiness can be measured, for example, using a handy-type glossmeter, "Gloss Checker IG-331" (manufactured by Tsuyagen Co., Ltd.). Such a resin compact with excellent beauty can be obtained, for example, by the production method of a resin compact according to the present invention, where a direct molding method described later is used.

The resin compact of this exemplary embodiment can be obtained, for example, by a known shaping method such as injection molding, injection compression molding and extrusion molding.

The resin compact of this exemplary embodiment preferably contains a flame retardant. Examples of the flame retardant include a halogen-based flame retardant such as bromine and chlorine, a phosphorus-based flame retardant such as melamine polyphosphate, condensed phosphoric acid ester and ammonium polyphosphate, a silicone-based flame retardant, and a metal hydroxide. Among these, flame retardants except for the halogen-based flame retardant are preferred because of fear of dioxin generated when burned.

In the resin compact of this exemplary embodiment, assuming that the entire amount of the resin compact is 100 parts by mass, the content of the flame retardant is preferably from 0.1 to 200 parts by mass, more preferably from 0.1 to 50 parts by mass. If the content of the flame retardant is less than 0.1 part by mass, it tends to be difficult to obtain sufficiently high flame retardance, whereas if it exceeds 200 parts by mass, the mechanical strength of the compact is liable to decrease.

The resin compact of this exemplary embodiment may further contain other additives in addition to those components described above. Examples of such an additive include a drip inhibitor, a compatibilizer, a toughening agent, an antistatic agent, an antioxidant, a weathering agent and a hydrolysis inhibitor. The content of such an additive is not particularly limited as long as it is in the range of not impairing the mechanical strength of the compact, but the content of each additive is preferably 2 mass % or less based on the entire amount of the resin compact.

The usage of the resin compact of this exemplary embodiment is not particularly limited, but specific examples thereof include a casing or various parts of electronic/electric devices and office equipment, and a part of home electric appliances such as audio equipment and electronic musical instrument, and various vehicles. Among these, a casing of electronic/electric devices, office equipment or the like is preferred.

<Production Method of Resin Compact>

The preferred exemplary embodiment of the method for producing a resin compact of the present invention is described below.

The method for producing a resin compact of this exemplary embodiment comprises shaping a mixture comprising a first resin composition allowing the Charpy impact strength in the direction parallel to the resin flow direction at the shaping to become from 1.5 to 8.0 times the Charpy impact strength in the direction crossing the resin flow direction at the shaping, and one or more resin compositions different from the first resin composition, with the content of the first resin composition being from 50 to 95 mass %.

By this method, a resin compact comprising two or more kinds of resins is obtained, wherein assuming that the Charpy impact strength in the resin flow direction at the shaping is $S_{MD}$ and the Charpy impact strength in the direction crossing the resin flow direction at the shaping is $S_{TD}$, $S_{MD}/S_{TD}$ is from 3.5 to 5.0.

The first resin composition may be sufficient if when such a resin composition is shaped, the Charpy impact strength in the MD direction becomes from 1.5 to 8.0 times, preferably from 3.0 to 5.5 times, the Charpy impact strength in the TD direction.

In this exemplary embodiment, the first resin composition preferably contains a polycarbonate-based resin and an acrylonitrile-butadiene-styrene-based resin. Examples of the polycarbonate-based resin and acrylonitrile-butadiene-styrene-based resin include those described above.

The first resin composition preferably contains a polycarbonate-based resin having a p-cumylphenoxy group represented by formula (1) and ensures that the content of the polycarbonate-based resin becomes from 10 to 90 mass % based on the entire amount of the resin compact. From the standpoint of ensuring the mechanical strength and effectively utilizing the recycled material, the content of the polycarbonate-based resin is more preferably from 15 to 86 mass %, still more preferably from 20 to 80 mass %, based on the entire amount of the resin compact.

The first resin composition may contain an additive such as flame retardant, drip inhibitor, compatibilizer, toughening agent, antistatic agent, antioxidant, weathering agent and hydrolysis inhibitor. The amount blended of such an additive is appropriately set to account for a predetermined amount in the resin compact by taking into consideration the amount of the additive contained in a resin composition different from the first resin composition.

The first resin composition is preferably mixed in the granulated form (as pellets) with a resin composition different from the first resin composition.

The resin composition different from the first resin composition includes those containing one or more kinds of resins in the group (B).

In this exemplary embodiment, from the standpoint of ensuring the mechanical strength and effectively utilizing the recycled material, the resin composition different from the first resin composition preferably contains the above-described recycled material of polycarbonate-based resin, recycled material of PC/ABS alloy resin or recycled material of PC/PS alloy resin. Also, the resin composition different from the first resin may contain a recycled material of the resin compact of the present invention.

The content of the recycled material in the resin composition different from the first resin composition is preferably set to become from 5 to 15 mass %, more preferably from 10 to 15 mass %, based on the entire amount of the resin compact.

The resin composition different from the first resin composition may contain two or more kinds of resins. For example, a recycled material obtained by grinding a member which is obtained by sandwich molding and in which a skin material and a core material are mixed, may be contained.

In this exemplary embodiment, the first resin composition and two or more kinds of resin compositions different from the first resin composition may be mixed.

Also, in this exemplary embodiment, the ratio $S1_{MD}/S1_{TD}$ of the Charpy impact strength $S1_{MD}$ in the MD direction to the Charpy impact strength $S1_{TD}$ in the TD direction when the first resin composition is shaped, and the ratio $S2_{MD}/S2_{TD}$ of the Charpy impact strength $S2_{MD}$ in the MD direction to the Charpy impact strength $S2_{TD}$ in the TD direction when the resin composition different from the first resin composition is shaped, preferably satisfy the following relationship:

$$0.2 \leq [(S1_{MD}/S1_{TD})/(S2_{MD}/S2_{TD})] \leq 8$$

If $[(S1_{MD}/S1_{TD})/(S2_{MD}/S2_{TD})]$ exceeds 8, $S_{MD}/S_{TD}$ of the obtained resin compact is liable to exceed 5.0 and the Charpy impact strength tends to decrease, whereas if $[(S1_{MD}/S1_{TD})/(S2_{MD}/S2_{TD})]$ is less than 0.2, the effect of maintaining or enhancing the Charpy impact strength of the first resin composition can be hardly obtained.

In the case of obtaining the above-described mixture, the first resin composition, a resin composition different from the first resin composition and if desired, additives may be melt-mixed under heating and thereby shaped into a particle form, but in this exemplary embodiment, without such shaping, the components are preferably mixed under no heating. In this case, the mechanical properties (Charpy impact strength and tensile property) of the resin compact can be more enhanced.

As regards the method of shaping the mixture above, for example, a known shaping method such as injection molding, injection compression molding and extrusion molding may be used.

In this exemplary embodiment, when the first resin composition contains a polycarbonate-based resin, the shaping temperature is preferably set to 235 to 245° C. If the shaping temperature is less than 235° C., insufficient melting of the resin composition tends to result, whereas if it exceeds 245° C., the Charpy impact strength is liable to decrease due to heat deterioration.

In this exemplary embodiment, as described above, the mixture is preferably shaped by a direct molding method. More specifically, a method of charging the first resin composition, a resin composition different from the first resin composition and, if desired, additives into an injection molding machine, and continuously performing the mixing and the shaping of the resin compact is preferably employed. That is, direct shaping without melt-mixing the resin compositions under heating and once pelletizing the mixture, is preferred in view of mechanical property of the obtained resin compact, workability, power consumption and production efficiency.

According to the production method of a resin compact of this exemplary embodiment, a resin compact excellent in the mechanical property can be produced from a plurality of resin compositions.

Also, the production method of a resin compact of this exemplary embodiment can be utilized as a method of enhancing the Charpy impact strength of the first resin composition without impairing the tensile property.

Furthermore, the production method of a resin compact of this exemplary embodiment enables to produce a resin compact excellent in the mechanical property even when a recycled material is used as the resin composition different from the first resin composition and therefore, can be utilized as a recycling method for used resins or a recycling method for resin compacts. In this case, the first resin composition functions as a material for recycling the used resin.

<Casing>

FIG. 1 is an outer appearance perspective view when an image forming apparatus comprising a casing and office equipment parts according to one exemplary embodiment of the resin compact of the present invention is seen from the front side. In FIG. 1, the image forming apparatus 100 comprises front covers 120a and 120b at the front of a main body apparatus 110. These front covers 120a and 120b are open/closable so that an operator can operate the inside of the apparatus. By virtue of this construction, the operator can replenish a toner when a toner is consumed, replace the wasted process cartridge, or remove the jammed paper on occurrence of paper jamming in the apparatus. FIG. 1 shows the apparatus in the state of the front covers 120a and 120b being opened.

On the top of the main body apparatus 110, an operation panel 130 into which various conditions concerning the image formation, such as paper size and number of sheets, are input through the operation by an operator, and a copy glass 132 on which the original to be read is placed, are provided. The main body apparatus 110 also comprises, at the upper part thereof, an automatic original conveying device 134 capable of automatically conveying the original onto the copy glass 132. Furthermore, the main body apparatus 110 comprises an image reading device for scanning the original image disposed on the copy glass 132 and obtaining image data representing the original image. The image data obtained by this image reading device are sent to an image forming unit through a control part. The image reading device and the control part are housed inside a casing 150 constituting a part of the main body apparatus 110. Also, the image forming unit is provided in the casing 150 as a removable process cartridge 142. The process cartridge 142 can be loaded or removed by turning an operation lever 144.

In the casing 150 of the main body apparatus 110, a toner housing part 146 is fixed, and a toner can be replenished from a toner supply port 148. The toner housed in the toner housing part 146 is fed to a developing device.

In the lower part of the main body apparatus 110, paper housing cassettes 140a, 140b and 140c are provided. Also, in the main body apparatus 110, a plurality of conveying rollers each composed of a pair of rollers are arrayed in the apparatus, whereby a conveying path allowing the paper in the paper housing cassette to be conveyed to the image forming unit located above the cassette is formed. The paper in each paper housing cassette is taken out one by one by a paper take-out mechanism disposed near the end of the conveying path and delivered to the conveying path. A paper tray 136 for manual feeding is provided on the side surface of the main body apparatus 110, and the paper can be fed also from this tray.

The paper on which an image is formed by the image forming unit is sequentially transferred between two fixing rolls abutting against each other and being supported by a casing 152 constituting a part of the main body apparatus 110 and then discharged outside the main body apparatus 110. In the main body apparatus 110, a plurality of discharge trays 138 are provided on the side opposite the side where the paper tray 136 is provided, and the paper after image formation is discharged to these trays.

The resin compact of the present invention can satisfactorily maintain excellent mechanical property even when containing a recycled material (particularly, when the content of the recycled material is from 5 to 95 mass %) and therefore, is suitable as the exterior casing (housing), members (e.g., front cover, rear cover) constituting the casing, toner cartridge or paper feed tray of the above-described electrophotographic apparatus. In this case, the amount used of the recycled material in the electrophotographic apparatus can be more increased.

EXAMPLES

The present invention is described in greater detail below by referring to Examples, but the present invention is not limited to these Examples.

<Preparation of Resin Composition>

Resin Compositions A to F and Recycled Materials A and B shown below are prepared. In this Example, the Charpy impact strength in the MD direction at the shaping of the resin composition is expressed as MD ($kJ/m^2$), and the Charpy impact strength in the TD direction at the shaping of the resin composition is expressed as TD ($kJ/m^2$)

Resin Composition A:

A mixture (pellet) of 75 parts by mass of polycarbonate resin "LEXAN 221R" (trade name, produced by Nippon GE Plastics Co.) having p-cumylphenoxy group represented by the following formula (1) as the terminal group, 25 parts by mass of ABS resin "SANTAC AT07" (trade name, produced by Nippon A&L Inc.), 10 parts by mass of "CR741" (resorcinol diphosphate, produced by Daihachi Chemical Industry Co., Ltd.) as the flame retardant, and 0.5 parts by mass of polytetrafluoroethylene (produced by Shanghai/Sun Chemical Co., Ltd.) as the drip inhibitor, MD:TD=48.4:9.0, MD/TD=5.4.

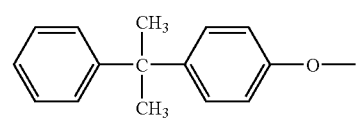

(1)

Resin Composition B:

PC/ABS Alloy resin "Multilon TN7300" (trade name, produced by Teijin Chemicals Ltd.), MD:TD=15:12, MD/TD<1.5.

Resin Composition C:

A mixture (pellet) of 75 parts by mass of polycarbonate resin "LEXAN 221R" (trade name, produced by Nippon GE Plastics Co.) having p-cumylphenoxy group represented by formula (1) as the terminal group, 25 parts by mass of ABS resin "SANTAC AT07" (trade name, produced by Nippon A&L Inc.), 10 parts by mass of "METABLEN S2001" (trade name, produced by Mitsubishi Rayon Co., Ltd.) as the impact strength modifier, 10 parts by mass of "CR741" (resorcinol diphosphate, produced by Daihachi Chemical Industry Co., Ltd.) as the flame retardant, and 0.5 parts by mass of polytetrafluoroethylene (produced by Shanghai/Sun Chemical Co., Ltd.) as the drip inhibitor, MD:TD=42.0:4.9, MD/TD=8.6.

Resin Composition D:

A mixture of 70 parts by mass of polycarbonate resin "FC1700" (trade name, produced by Idemitsu Petro-Chemical Co., Ltd.) having p-tert-butylphenoxy group represented by the following formula (2) as the terminal group, 30 parts by mass of ABS resin "B600N" (trade name, produced by Ube Cycon Ltd.), and 15 parts by mass of "PX200" (condensed phosphoric acid ester, produced by Daihachi Chemical Industry Co., Ltd.) as the flame retardant, MD:TD=33.0:26.0, MD/TD=1.3.

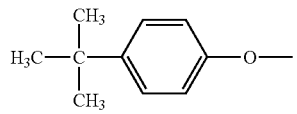

(2)

Resin Composition E:
A resin composition after allowing Resin Composition D to stay in a cylinder of a 360 ton molding machine at 260° C. for 15 minutes.
Resin Composition F:
PC/PS Alloy resin "TARFLON NN2710AS" (produced by Idemitsu Kosan Co., Ltd.).
Recycled Material A:
A material obtained by recovering a molded article comprising PC/PS alloy resin "TARFLON NN2710AS" (produced by Idemitsu Kosan Co., Ltd.), which had been used in the market for 1 to 3 years, and grinding it to a size of 12 mm mesh.
Recycled Material B:
A material obtained by grinding a sandwich molded article of 80 parts by mass of a skin material comprising Resin Composition A and 20 parts by mass of a core material comprising Resin Composition D, to a size of 12 mm mesh.
<Production of Resin Compact>

Example 1

90 Parts by mass of Resin Composition A and 10 parts by mass of Resin Composition D are simply mixed in a 50 kg tumbler under no heating for 15 minutes. The obtained mixture is charged into the injection molding machine "NEX500" (manufactured by Nissei Plastic Industrial Co., Ltd.) and injection molded under the conditions of a cylinder temperature of 235° C. and a die temperature of 60° C., whereby an ISO multipurpose specimen and a UL specimen (thickness: 2 mm) are obtained as the resin compact.

Example 2

90 Parts by mass of Resin Composition A and 10 parts by mass of Resin Composition E are simply mixed in a 50 kg tumbler under no heating for 15 minutes. The obtained mixture is charged into the injection molding machine "NEX500" (manufactured by Nissei Plastic Industrial Co., Ltd.) and injection molded under the conditions of a cylinder temperature of 235° C. and a die temperature of 60° C., whereby an ISO multipurpose specimen and a UL specimen (thickness: 2 mm) are obtained as the resin compact.

Example 3

90 Parts by mass of Resin Composition A and 10 parts by mass of Resin Composition F are simply mixed in a 50 kg tumbler under no heating for 15 minutes. The obtained mixture is charged into the injection molding machine "NEX500" (manufactured by Nissei Plastic Industrial Co., Ltd.) and injection molded under the conditions of a cylinder temperature of 235° C. and a die temperature of 60° C., whereby an ISO multipurpose specimen and a UL specimen (thickness: 2 mm) are obtained as the resin compact.

Example 4

90 Parts by mass of Resin Composition A and 10 parts by mass of Recycled Material A are simply mixed in a 50 kg tumbler under no heating for 15 minutes. The obtained mixture is charged into the injection molding machine "NEX500" (manufactured by Nissei Plastic Industrial Co., Ltd.) and injection molded under the conditions of a cylinder temperature of 235° C. and a die temperature of 60° C., whereby an ISO multipurpose specimen and a UL specimen (thickness: 2 mm) are obtained as the resin compact.

Example 5

90 Parts by mass of Resin Composition A and 10 parts by mass of Recycled Material B are simply mixed in a 50 kg tumbler under no heating for 15 minutes. The obtained mixture is charged into the injection molding machine "NEX500" (manufactured by Nissei Plastic Industrial Co., Ltd.) and injection molded under the conditions of a cylinder temperature of 235° C. and a die temperature of 60° C., whereby an ISO multipurpose specimen and a UL specimen (thickness: 2 mm) are obtained as the resin compact.

Example 6

90 Parts by mass of Resin Composition A and 10 parts by mass of Resin Composition D are simply mixed in a 50 kg tumbler under no heating for 15 minutes. The obtained mixture is charged into the injection molding machine "NEX500" (manufactured by Nissei Plastic Industrial Co., Ltd.) and injection molded under the conditions of a cylinder temperature of 255° C. and a die temperature of 60° C., whereby an ISO multipurpose specimen and a UL specimen (thickness: 2 mm) are obtained as the resin compact.

Example 7

90 Parts by mass of Resin Composition A and 10 parts by mass of Resin Composition D are melt-mixed under heating and thereby pelletized. The obtained mixture (pellet) is charged into the injection molding machine "NEX500" (manufactured by Nissei Plastic Industrial Co., Ltd.) and injection molded under the conditions of a cylinder temperature of 235° C. and a die temperature of 60° C., whereby an ISO multipurpose specimen and a UL specimen (thickness: 2 mm) are obtained as the resin compact.

Reference Example 1

Only Resin Composition A is charged into the injection molding machine "NEX500" (manufactured by Nissei Plastic Industrial Co., Ltd.) and injection molded under the conditions of a cylinder temperature of 235° C. and a die temperature of 60° C., whereby an ISO multipurpose specimen and a UL specimen (thickness: 2 mm) are obtained as the resin compact.

Reference Example 2

Only Resin Composition A is charged into the injection molding machine "NEX500" (manufactured by Nissei Plastic Industrial Co., Ltd.) and injection molded under the conditions of a cylinder temperature of 255° C. and a die temperature of 60° C., whereby an ISO multipurpose specimen and a UL specimen (thickness: 2 mm) are obtained as the resin compact.

Comparative Example 1

90 Parts by mass of Resin Composition B and 10 parts by mass of Resin Composition D are simply mixed in a 50 kg tumbler under no heating for 15 minutes. The obtained mixture is charged into the injection molding machine "NEX500" (manufactured by Nissei Plastic Industrial Co., Ltd.) and injection molded under the conditions of a cylinder temperature of 235° C. and a die temperature of 60° C., whereby an ISO multipurpose specimen and a UL specimen (thickness: 2 mm) are obtained as the resin compact.

Comparative Example 2

90 Parts by mass of Resin Composition C and 10 parts by mass of Resin Composition D are simply mixed in a 50 kg tumbler under no heating for 15 minutes. The obtained mixture is charged into the injection molding machine "NEX500" (manufactured by Nissei Plastic Industrial Co., Ltd.) and injection molded under the conditions of a cylinder temperature of 235° C. and a die temperature of 60° C., whereby an ISO multipurpose specimen and a UL specimen (thickness: 2 mm) are obtained as the resin compact.

With respect to the resin compacts (ISO multipurpose specimens) obtained above in Examples 1 to 7, Reference Examples 1 and 2, and Comparative Examples 1 and 2, the Charpy impact resistant strength ratio MD/TD is determined according to the following method. The results obtained are shown in Table 1.

[Charpy Impact Strength Ratio]

Using an ISO multipurpose dumbbell specimen subjected to a notching process, the Charpy impact resistant strength MD in the MD direction and the Charpy impact resistant strength TD in the TD direction each is measured by a digital impact tester (manufactured by Toyo Seiki Seisaku-Sho, Ltd.) according to JIS K7111 under the conditions such that the lifting angle is 150°, the hammer used is 2.0 J and the number of measurements is n=10, and the Charpy impact resistant strength ratio MD/TD is determined.

Also, with respect to the resin compacts (ISO multipurpose specimens) obtained above in Examples 1 to 7, Reference Examples 1 and 2, and Comparative Examples 1 and 2, the Charpy impact resistant strength, tensile yielding point strength, tensile yielding point elongation and tensile modulus are measured according to the following methods. Furthermore, with respect to the resin compacts (UL specimens) obtained above in Examples 1 to 7, Reference Examples 1 and 2, and Comparative Examples 1 and 2, the flame retardance is evaluated according to the following method. The results obtained are shown together in Table 1.

[Charpy Impact Strength]

Using the ISO multipurpose dumbbell specimen subjected to a notching process, the Charpy impact resistant strength ($kJ/m^2$) in the MD direction is measured by a digital impact tester (manufactured by Toyo Seiki Seisaku-Sho, Ltd.) according to JIS K7111 under the conditions such that the lifting angle is 150°, the hammer used is 2.0 J and the number of measurements is n=10.

[Tensile Yielding Point Strength, Tensile Yielding Point Elongation, Tensile Modulus]

With respect to the ISO multipurpose dumbbell specimen, the tensile yielding point strength (MPa), tensile yielding point elongation (%) and tensile modulus (MPa) each is measured by Instron 5566 (manufactured by Toyo Seiki Seisaku-Sho, Ltd.) according to JIS K7161 under the conditions such that the test speed is 50 mm/min, the chuck-to-chuck distance is 115 mm and the number of measurements is n=5.

[Evaluation of Flame Retardance]

With respect to the UL specimen (thickness: 2 mm), the flame retardance is evaluated according to UL94V. Incidentally, the conditioning is performed under the conditions of 23° C.±2° C. and 50±5% RH for 48 hours. In the column of flammability in Table 1, "Not V" indicates that the flame retardance did not reach the V level in the UL combustion test.

TABLE 1

|   | Charpy Impact Strength Ratio MD/TD of Resin Compact | Charpy Impact Strength (MD direction) ($kJ/m^2$) | Tensile Yielding Point Strength (MPa) | Tensile Yielding Point Elongation (%) | Tensile Modulus (MPa) | UL94V Flammability (thickness of specimen: 2 mm) |
|---|---|---|---|---|---|---|
| Example 1 | 3.5 | 41 | 62 | 4.8 | 2232 | V-0 |
| Example 2 | 3.5 | 31 | 60 | 4.3 | 2430 | V-0 |
| Example 3 | 4.0 | 46 | 61 | 4.3 | 2500 | V-0 |
| Example 4 | 5.0 | 34 | 60 | 4.2 | 2540 | V-1 |
| Example 5 | 3.5 | 34 | 63 | 4.3 | 2392 | V-0 |
| Example 6 | 3.5 | 17 | 59 | 4.0 | 2200 | V-1 |
| Example 7 | 3.5 | 31 | 61 | 4.5 | 2364 | V-0 |
| Reference Example 1 | 5.4 | 28 | 61 | 4.6 | 2320 | V-1 |
| Reference Example 2 | 3.0 | 20 | 59 | 4.0 | 2222 | Not V |
| Comparative Example 1 | 1.0 | 26 | 62 | 4.3 | 2440 | V-0 |
| Comparative Example 2 | 6.0 | 50 | 55 | 6.0 | 2100 | V-0 |

Incidentally, the Charpy impact strength of Recycled Material A is 23 $kJ/m^2$, the Charpy impact strength of the new material of Resin Composition B is 29 $kJ/m^2$, and the Charpy impact strength of the new material of Resin Composition C is 75 $kJ/m^2$.

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A resin compact, comprising:
two or more kinds of resins,
wherein when a Charpy impact strength in a resin flow direction at shaping is $S_{MD}$ and a Charpy impact strength in a direction crossing the resin flow direction at shaping is $S_{TD}$, $S_{MD}/S_{TD}$ is from 3.5 to 5.0, and
the two or more kinds of resins comprise at least a polycarbonate-based resin having a p-cumylphenoxy group represented by formula (1), $S_{MD}/S_{TD}$ of which is from 1.5 to 8.0

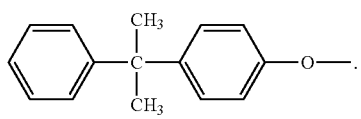
(1)

2. The resin compact according to claim 1,
wherein the two or more kinds of resins further comprise at least one resin selected from the group consisting of an alloy resin of a polycarbonate-based resin and an acrylonitrile-butadiene-styrene-based resin, an alloy resin of a polycarbonate-based resin and a styrene-based resin, a recycled material of a polycarbonate-based resin, a recycled material of an alloy resin of a polycarbonate-based resin and an acrylonitrile-butadiene-styrene-based resin, a recycled material of an alloy resin of a polycarbonate-based resin and a styrene-based resin, a recycled material of a polycarbonate-based resin having at least partially a siloxane bond, and a recycled material of an alloy resin of a polycarbonate-based resin having at least partially a siloxane bond.

3. The resin compact according to claim 1, which comprises one or more members selected from the group consisting of: an alloy resin of a polycarbonate-based resin and an acrylonitrile-butadiene-styrene-based resin; and an alloy resin of a polycarbonate-based resin and a styrene-based resin.

4. A method for producing the resin compact according to claim 1, comprising:
shaping a mixture that comprises:
a first resin composition allowing a Charpy impact strength in a resin flow direction at shaping to become from 1.5 to 8.0 times a Charpy impact strength in a direction crossing the resin flow direction at shaping; and
one or more resin compositions different from the first resin composition,
with a content of the first resin composition being from 50 to 95 mass %,
wherein the first resin composition comprises a polycarbonate-based resin having a p-cumylphenoxy group represented by formula (1)

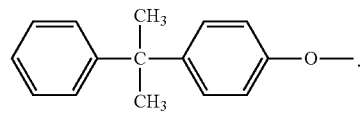
(1)

5. The method for producing a resin compact according to claim 4,
wherein a content of the polycarbonate-based resin is from 10 to 90 mass % based on the entire amount of the resin compact.

6. The method for producing a resin compact according to claim 4, wherein the mixture is shaped by a direct molding method.

7. A casing, comprising the resin compact according to claim 1.

* * * * *